UNITED STATES PATENT OFFICE.

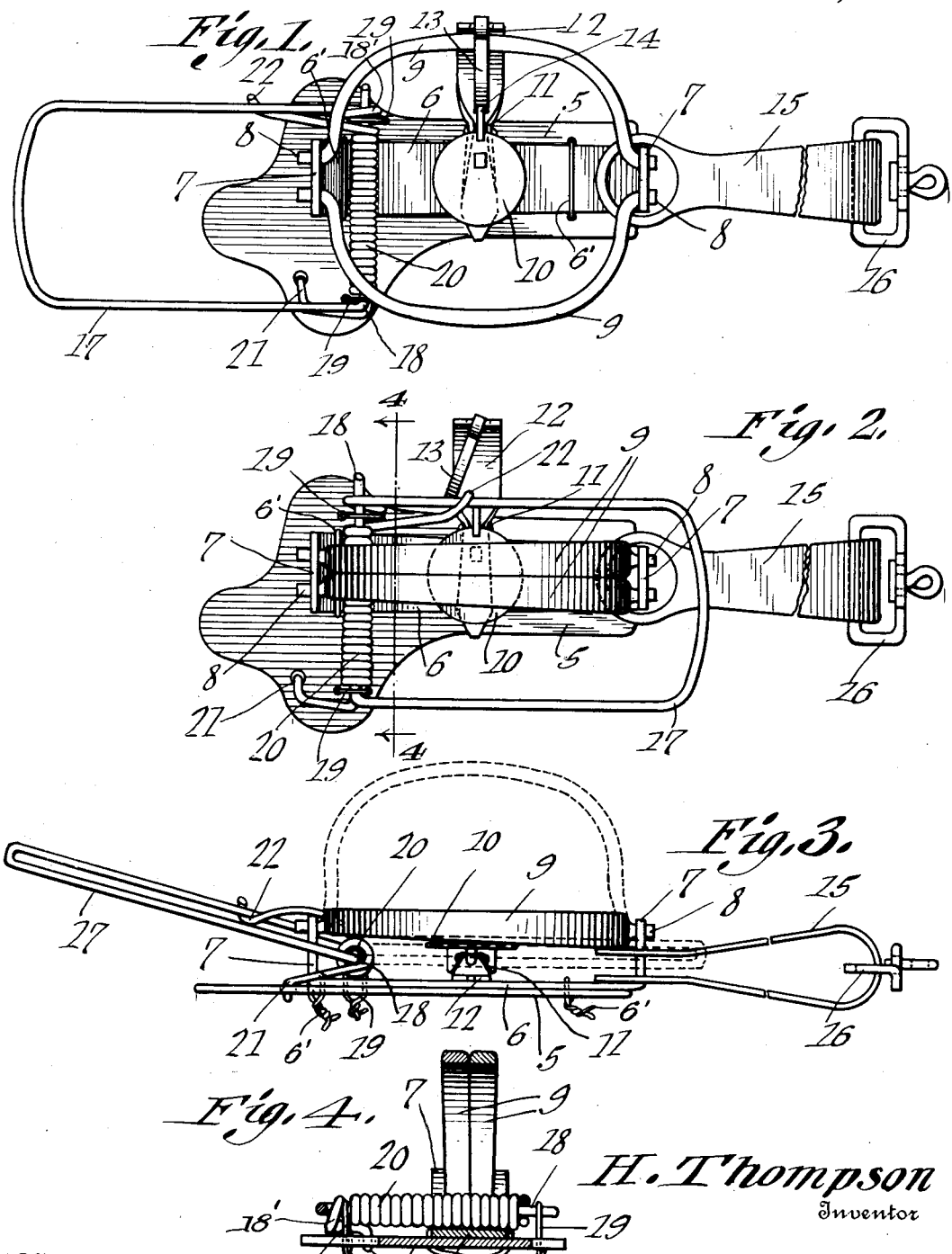

HARMON THOMPSON, OF MUSKEGON, MICHIGAN.

TRAP.

1,404,070.   Specification of Letters Patent.   Patented Jan. 17, 1922.

Application filed February 20, 1920. Serial No. 360,130.

*To all whom it may concern:*

Be it known that I, HARMON THOMPSON, a citizen of the United States, residing at Muskegon, in the county of Muskegon and State of Michigan, have invented a new and useful Trap, of which the following is a specification.

This invention has reference to spring traps, and more particularly to spring traps especially adapted for catching relatively small animals, such as rats, rabbits or the like.

The primary object of the invention is to provide a trap of this character having means to engage the body of the animal to securely hold the same, thus preventing the animal from releasing itself by twisting off its foot.

A further object of the invention is to provide a device of this character having means for increasing the gripping action of the jaws of the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a plan view of a trap constructed in accordance with the present invention, the trap being shown in its set position.

Figure 2 illustrates a plan view of the trap, showing the same in its operated position.

Figure 3 illustrates a side elevational view of the trap in its set position, the same being shown in dotted lines, in its operated position, and Figure 4 illustrates a sectional view taken on line 4—4 of Figure 2.

Referring to the drawing in detail, the reference character 5 designates the base or body portion of the trap, to which the jaw support 6 is secured as by means of the wire loops 6′, which comprises right angled arms 7, which are apertured to receive the ends 8 of the jaws 9.

These jaws 9 are curved to form a circular space, when the jaws are in their open position, which space is adapted to accommodate the treadle 10 pivotally connected between the ears 11 of the right angle arm 12, one end of said arm being apertured to receive the detent 13, which, when the trap is set, overlies one edge of one of the jaws, the free end of said trigger engaging under the shoulder 14 carried by the treadle 10 so that the jaws 9 are secured in their open positions.

The spring 15 comprises a length of resilient spring metal bent intermediate its length to provide opposed arms and to receive the securing member 16, by means of which the trap may be staked or otherwise secured against displacement.

The inner ends of the spring 15 are apertured to receive the right angled ends of the jaws 9, so that when the trap has been operated, the resiliency of the metal forming the spring 15 will cause the arms to move away from each other, with the result that the arms move the jaws to the position as indicated by Figure 2 of the drawing.

The attachment, forming the subject matter of the present invention, includes a length of wire bent to form a loop 17, one end of the loop extending at right angles as at 18, the opposite end of said loop being bent around the right angled end as at 18′ to secure the ends of the loop together.

Suitable securing means, such as wire loops 19, extend through openings formed in the base of the trap, and embrace portions of the right angled end of the loop to secure the loop in operative relation on the trap end as shown, this right angled end of the loop lies between the right angled ends of the jaw support adjacent one end thereof, for purposes to be hereinafter described.

Supported on the right angled end of the loop, is a coiled spring 20 which has one of its ends anchored to the base 5 as at 21, the opposite end thereof being hooked over one of the arms of the loop members 17 as at 22, so that movement of the loop member 17 to a position as indicated by Figure 1 of the drawing, acts to increase the tension of the coiled spring 20, so that when the trap is tripped, the coiled spring moves the loop portion 17 to a position as indicated by Figure 2 of the drawing to the end that an animal caught between the jaws 9 of the trap is further held by means of the loop members 17 contacting with the body of the animal, thus throwing the animal to a position to prevent the animal from twisting to effect his release.

In operation, assuming that the trap is set, an animal stepping on the treadle 10 causes the shoulder 14 to release the detent 13. The jaws 9 are now moved to a closed position by resiliency of the spring 15 together with the tension exerted to the jaws 9 through the medium of the loop 17, which moves to a position as indicated by Figure 2 of the drawing, when the jaws are moved to their closed positions.

Having thus described the invention, what I claim as new is:—

In a trap, a base having upstanding right angled arms secured thereto, the arms having openings, curved jaws having their ends positioned within the openings, a spring member having openings to accommodate one of the right angled arms and adapted to engage the jaws to normally urge the same to closed positions, a detent overlying one of the jaws, means contacting with the detent for holding the same into engagement with one of the jaws for holding the jaws in set position, a jaw including a loop member having side arms disposed under the first mentioned jaws at a point adjacent to one of the ends thereof, means for normally urging the loop member to a position directly over the first mentioned jaws, said loop member being held in a set position by the jaws.

In testimony that I claim the foregoing as my own, I have hereto affixed my signature in the presence of two witnesses.

HARMON THOMPSON.

Witnesses:
 LOREN R. ADAMS,
 VELMA SERVICE.